United States Patent
Yoshida

(10) Patent No.: US 11,687,268 B2
(45) Date of Patent: Jun. 27, 2023

(54) OBJECT MIGRATION SYSTEM USING TAPE MEDIUM, OBJECT MIGRATION SOURCE STORAGE DEVICE, AND OBJECT MIGRATION DESTINATION STORAGE DEVICE

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 17/159,218

(22) Filed: Jan. 27, 2021

(65) Prior Publication Data

US 2021/0286543 A1 Sep. 16, 2021

(30) Foreign Application Priority Data

Mar. 13, 2020 (JP) .................. 2020-044816

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0646* (2013.01); *G06F 3/0682* (2013.01)

(58) Field of Classification Search
CPC .... G06F 3/0646; G06F 3/0647; G06F 3/0604; G06F 3/0682
See application file for complete search history.

(56) References Cited

U.S. PATENT DOCUMENTS

| | | | |
|---|---|---|---|
| 6,718,427 B1 | 4/2004 | Carlson et al. | |
| 2006/0059188 A1 | 3/2006 | Shirogane et al. | |
| 2012/0259810 A1* | 10/2012 | Kopylovitz | G06F 16/214 707/E17.005 |
| 2013/0194904 A1* | 8/2013 | Ochi | G11B 20/18 369/53.42 |

FOREIGN PATENT DOCUMENTS

| | | |
|---|---|---|
| JP | 2002-182952 A | 6/2002 |
| JP | 2006-085408 A | 3/2006 |
| JP | 2010-152603 A | 7/2010 |

* cited by examiner

*Primary Examiner* — Reginald G Bragdon
*Assistant Examiner* — Michael L Westbrook
(74) *Attorney, Agent, or Firm* — Fujitsu Patent Center

(57) ABSTRACT

A storage system includes a first storage device that includes a first memory and a first processor coupled to the first memory; and a second storage device that includes a second memory and a second processor coupled to the second memory, wherein the first processor is configured to: when migrating data in object units, generate dummy data that corresponds to the data instead of the data in object units, and transmit management information used to manage an object and the dummy data to the second storage device, and the second processor is configured to: store the management information in a storage unit in association with the object, and discard the dummy data.

5 Claims, 8 Drawing Sheets

US 11,687,268 B2

OBJECT MIGRATION SYSTEM USING TAPE MEDIUM, OBJECT MIGRATION SOURCE STORAGE DEVICE, AND OBJECT MIGRATION DESTINATION STORAGE DEVICE

CROSS-REFERENCE TO RELATED APPLICATION

This application is based upon and claims the benefit of priority of the prior Japanese Patent Application No. 2020-44816, filed on Mar. 13, 2020, the entire contents of which are incorporated herein by reference.

FIELD

The embodiment discussed herein is related to a storage system or the like.

BACKGROUND

A technique for replacing a storage device using a tape medium is disclosed.

For example, a device, which assists migration of data recorded in a first recording medium to a second recording medium, acquires the number of times when each piece of the data recorded in the first recording medium is read from the first recording medium. Then, the device grasps an access frequency of each piece of data by using the acquired number of times, and determines a recording position of each piece of data in the second recording medium on the basis of the access frequency.

Furthermore, for example, a technique is disclosed that stores operation environment specification information and storage software environment in a second storage device in association with stored data when the stored data stored in a first storage device is migrated to the second storage device. Japanese Laid-open Patent Publication No. 2010-152603, Japanese Laid-open Patent Publication No. 2006-85408, and Japanese Laid-open Patent Publication No. 2002-182952 are disclosed as related art.

SUMMARY

According to an aspect of the embodiments, a storage system includes a first storage device that includes a first memory and a first processor coupled to the first memory; and a second storage device that includes a second memory and a second processor coupled to the second memory, wherein the first processor is configured to: when migrating data in object units, generate dummy data that corresponds to the data instead of the data in object units, and transmit management information used to manage an object and the dummy data to the second storage device, and the second processor is configured to: store the management information in a storage unit in association with the object, and discard the dummy data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, there is a problem in that it takes cost when the storage device using the tape medium is replaced. For example, a storage system using a tape medium reads data recorded in a tape medium of the first storage device when data is migrated from the first storage device to the second storage device. Then, the storage system writes the read data to the second storage device. Therefore, it takes time to migrate the data. For example, when the storage device using the tape medium is replaced, it takes cost. In consideration of the above, it is desirable to reduce costs when the storage device using the tape medium is replaced.

Hereinafter, an embodiment of a storage system, a migration source storage device, and a migration destination storage device disclosed in the present application will be described in detail with reference to the drawings. Note that the embodiment does not limit the present embodiment.

Figure 8:
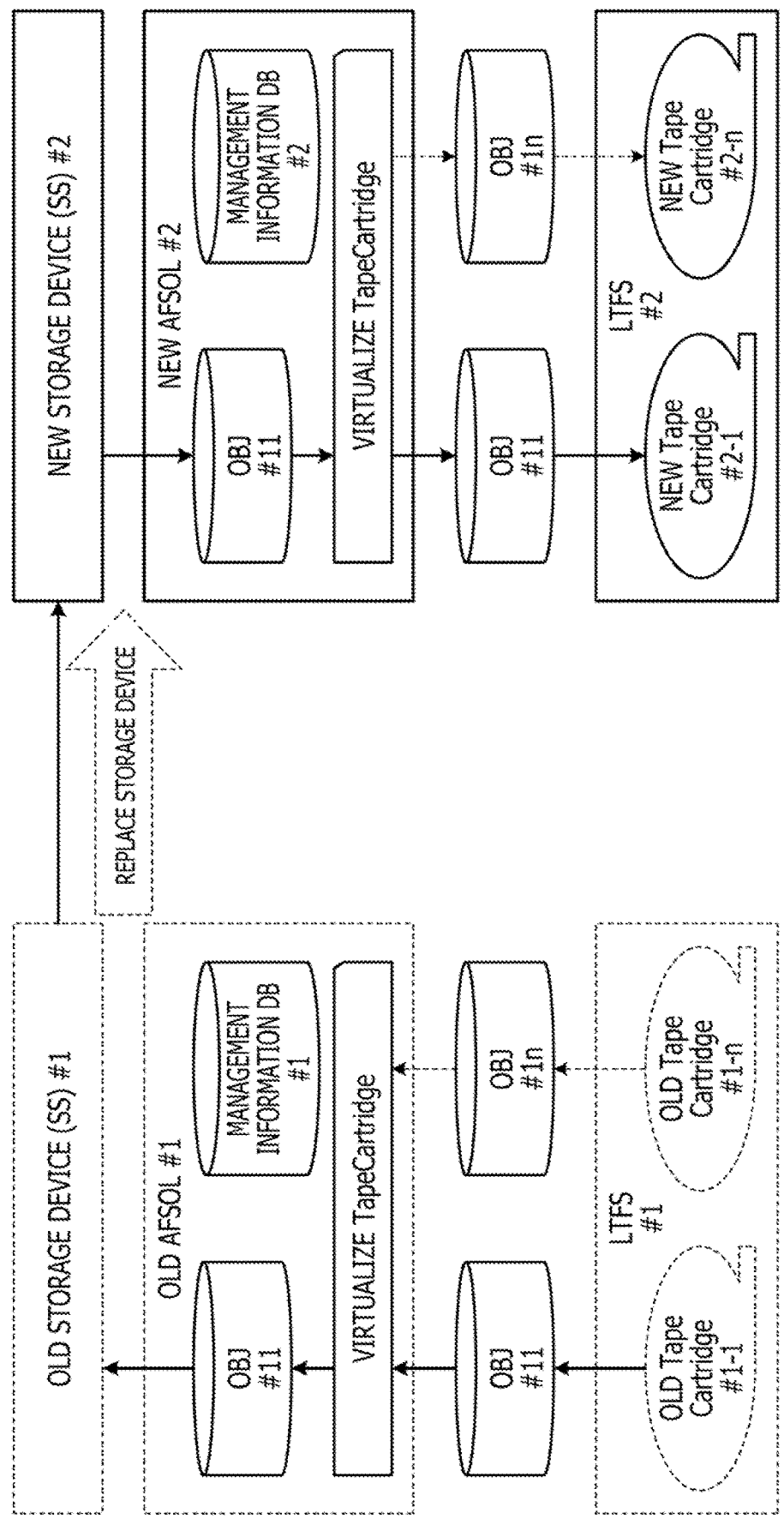
FIG. 8 is a diagram illustrating a reference example of migration of a storage device using a tape cartridge.

First, a reference example in which a storage device using a tape cartridge is replaced will be described with reference to FIG. 8. FIG. 8 is a diagram illustrating a reference example of a process of replacing the storage device using the tape cartridge. FIG. 8 illustrates a case where the storage device is replaced from an old storage device using a tape cartridge to a new storage device. The tape cartridge here is an object storage. The object storage is a storage medium using data in object units. Objects are managed by using metadata.

The storage device using the tape cartridge as the object storage incudes an AFSOL and a Linear Tape File System (LTFS). The AFSOL indicates a function for showing folders of each tape cartridge as a single folder. Furthermore, the LTFS indicates a function for showing each tape cartridge as a folder of a file system. The AFSOL and the LTFS are used to introduce the concept of the file system into the tape cartridge.

When receiving a migration command of an object in an old storage device, an old AFSOL reads the corresponding object from an old tape cartridge associated with an ID of the object on the basis of a management information DB. Here, when it is assumed that the objects for which the migration commands have been issued be OW #11 and OW #1n, the old AFSOL reads OW #11 and OW #1n from the old tape cartridge.

Then, the old storage device transmits the read object to the new storage device. Here, OW #11 and OBJ #1n are transmitted to the new storage device.

Then, in the new storage device, a new AFSOL associates an ID of the transmitted object with a new tape cartridge and records them in the management information DB. Here, the new AFSOL associates OW #11 and OW #1n respectively with new tape cartridges #2-1 and #2-n and records them in the management information DB.

Then, the new AFSOL records the transmitted object in the new tape cartridge. Here, OW #11 is recorded in the new tape cartridge #2-1, and OW #1n is recorded in the new tape cartridge #2-n.

In this way, when the storage device using the tape cartridge is replaced, the system reads the object from the old storage device and writes the object to the new storage device. Therefore, it takes time to read and write the object. For example, when the storage device using the tape cartridge is replaced, it takes cost. For example, the migration commands of the object are not issued in a recording order of the objects in the tape cartridge. Therefore, seeks frequently occur at the time of reading the object in the tape cartridge, and the storage device needs more time to read the object. For example, when the storage device using the tape cartridge is replaced, it takes cost.

Therefore, in the embodiment, a storage system that can reduce costs when the storage device using the tape cartridge is replaced will be described.

[Embodiments]

[Functional Configuration of Storage System]

Figure 1:
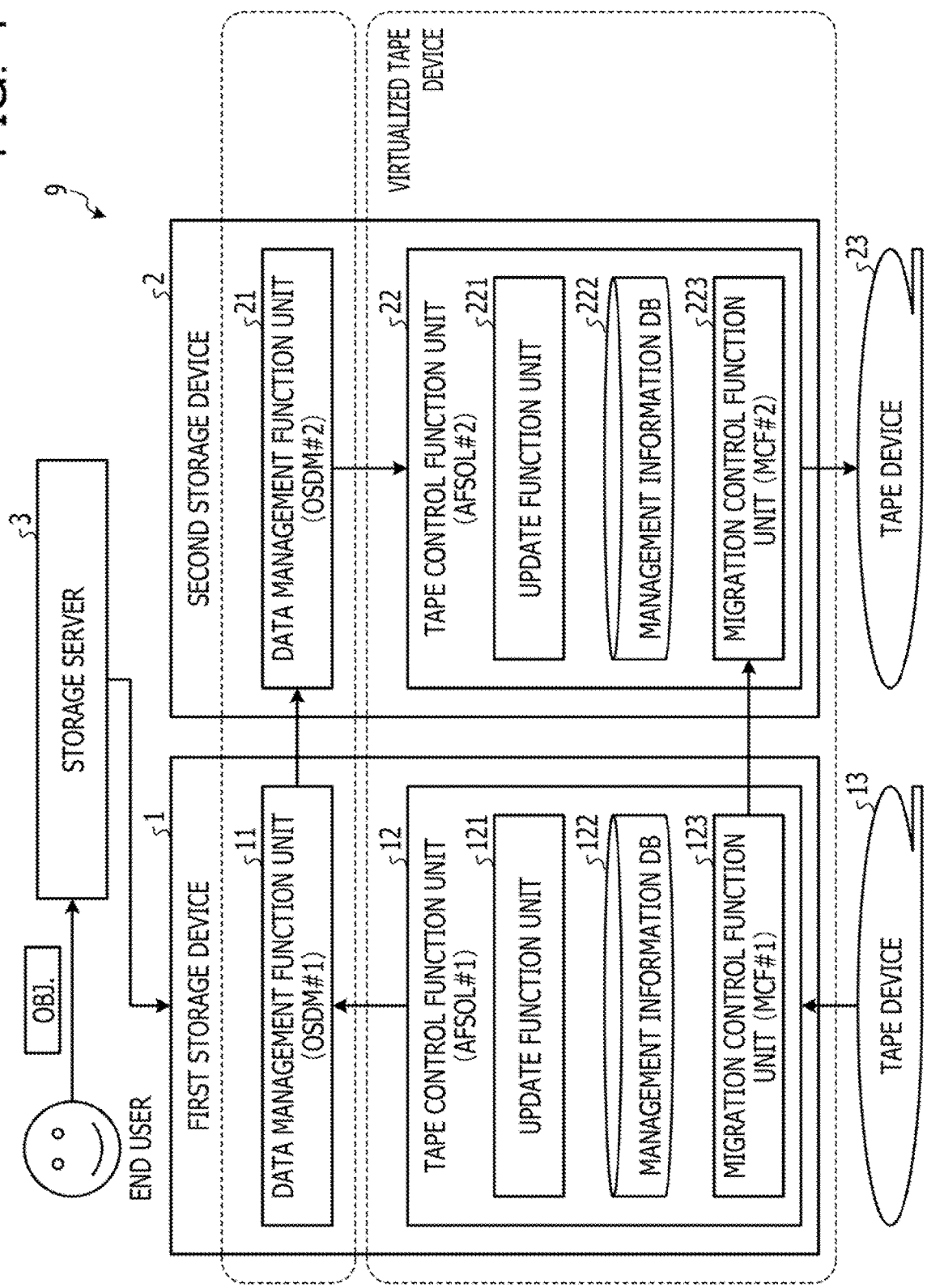
FIG. 1 is a diagram illustrating an example of a functional configuration of a storage system according to an embodiment.

FIG. 1 is a diagram illustrating an example of a functional configuration of a storage system according to an embodiment. As illustrated in FIG. 1, a storage system 9 includes a storage server 3, a first storage device 1, and a second storage device 2. The storage system 9 migrates data in object units in order to replace a storage device from the first storage device 1 with the second storage device 2. Hereinafter, there is a case where migration of data is referred to as "migration".

Note that a storage used by the storage system 9 is an object storage. The object storage is a storage medium using data in object units. In the embodiment, it is assumed that the tape cartridge be an object storage. Furthermore, it is assumed that each of the first storage device 1 and the second storage device 2 includes an AFSOL and a LTFS. The AFSOL indicates a function for showing folders of each tape cartridge as a single folder. The LTFS indicates a function for showing each tape cartridge as a folder of a file system. The AFSOL and the LTFS are used to introduce the concept of the file system into the tape cartridge. For example, the AFSOL and the LTFS can show each tape cartridge as a folder (directory). Furthermore, hereinafter, there is a case where the tape cartridge is abbreviated as a "cartridge".

The storage server 3 is a server that controls the first storage device 1 which is a replacement source (migration source) and the second storage device 2 which is a replacement destination (migration destination). The storage server 3 transmits a migration process command of an object to the replacement source first storage device 1. The migration process command of the object is issued, for example, in a case where a drive in a tape device of the replacement source (migration source) first storage device 1 fails or in a case where a standard of the tape device is changed. Furthermore, the migration process command of the object includes, for example, IDs of a single or a plurality of objects to be migrated.

The first storage device 1 is a replacement source storage device. The first storage device 1 includes a data management function unit 11, a tape control function unit 12, and a tape device 13.

The data management function unit 11 manages data in the object storage. The data management function unit 11 manages data used in object units (data in object storage) and folders. For example, the data management function unit 11 transmits dummy data, corresponding to data of an object to be migrated and generated by a migration control function unit 123 to be described later, to the second storage device 2 together with metadata of the object. The metadata includes a data creation date, a data creator, a data type, a storage period, the number of times of copies, or the like.

The tape control function unit 12 controls a tape cartridge. The tape control function unit 12 includes an update function unit 121, a management information DB 122, and the migration control function unit 123. Note that the tape control function unit 12 is a function unit corresponding to the AFSOL.

The update function unit 121 stores management information corresponding to the object in the management information DB 122.

The management information DB 122 stores the management information. The management information includes information regarding the object, information regarding the tape cartridge, and information regarding association between the object and the tape cartridge. Here, an example of the management information DB 122 will be described with reference to FIG. 2.

Figure 2:
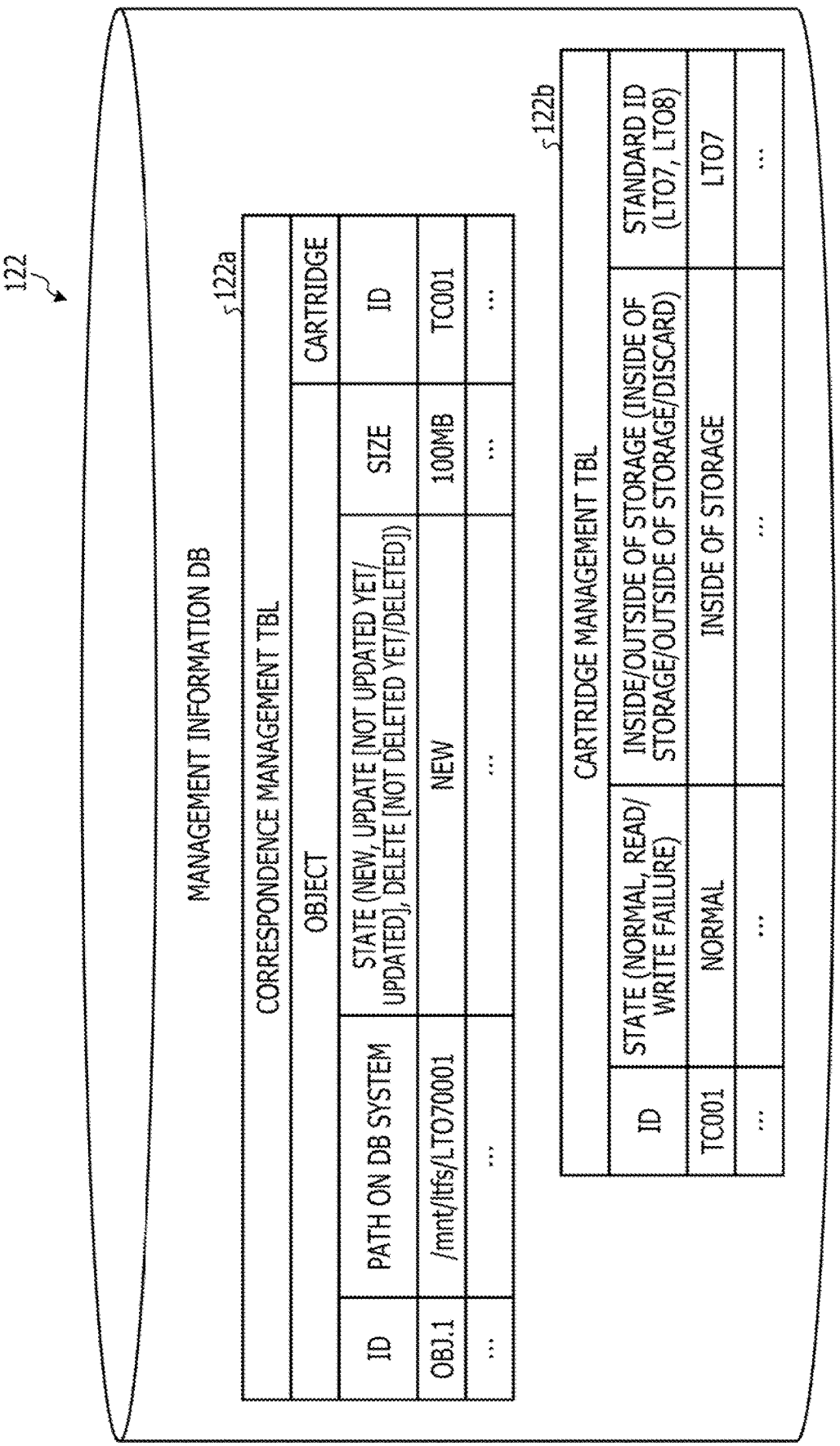
FIG. 2 is a diagram illustrating an example of a management information DB according to the embodiment.

FIG. 2 is a diagram illustrating an example of the management information DB according to the embodiment. As illustrated in FIG. 2, the management information DB 122 includes a correspondence management table 122a and a cartridge management table 122b.

The correspondence management table 122a stores the information regarding the object and an IDentifier (ID) of the cartridge in association with each other. The information regarding the object includes an ID, a path on a DB system, a state, and a size. The ID is an identifier that uniquely represents an object. The path on the DB system indicates a path of an object of a DB system managed by the LTFS. The state indicates a current state of the object. The state includes "new" indicating a newly added state, "update" indicating an updated state, "delete" indicating a deleted state, or the like. The size indicates a size of the object. The ID of the cartridge indicates an ID of a cartridge that stores the object. The ID of the cartridge is associated with the ID of the object.

The cartridge management table 122b stores an ID, a state, inside/outside of the storage, and a standard ID in association with each other. The ID is an identifier that uniquely represents a cartridge. The state indicates a current state of the cartridge. The state includes "normal" indicating normal, "reading failure" indicating a reading failure, and "writing failure" indicating a writing failure. The inside/outside of the storage indicates a place where the cartridge exists. The inside/outside of the storage includes "inside the storage" indicating that the cartridge is in the storage, "outside the storage" indicating that the cartridge is outside the storage, and "discarded" indicating that the cartridge is discarded. The standard ID is an ID indicating a standard of the cartridge.

Returning to FIG. 1, the migration control function unit 123 controls the migration (migration) of the object. For example, the migration control function unit 123 notifies the second storage device 2 of start of the object migration. Furthermore, the migration control function unit 123 refers to the management information DB 122 and acquires a size of the object to be migrated. The migration control function unit 123 generates dummy data having the acquired size for the object to be migrated. For example, the migration control function unit 123 generates the dummy data corresponding to the object without reading the data of the object from the cartridge. Furthermore, the migration control function unit 123 reads metadata corresponding to the object from a predetermined and prescribed location (Hard Disk Drive: HDD) in the second storage device 2. Furthermore, the migration control function unit 123 notifies the second storage device 2 of end of the object migration. Furthermore, the migration control function unit 123 transmits the management information associated with the object to be migrated to the second storage device 2. The management information here includes the information in the correspondence management table 122a and the information in the cartridge management table 122b that are associated with the ID of the object.

The tape device 13 can be equipped with a plurality of tape drives. The tape drive is equipped with a tape cartridge. Note that the tape device 13 corresponds to the LTFS that shows each tape cartridge as a folder of a file system.

The second storage device 2 is a replacement destination storage device. The second storage device 2 includes a data management function unit 21, a tape control function unit 22, and a tape device 23.

The data management function unit 21 manages data in the object storage. The data management function unit 21 manages data used in object units (data in object storage) and folders. For example, the data management function unit 21 receives the dummy data and the metadata transmitted from the first storage device 1.

The tape control function unit 22 controls a tape cartridge. The tape control function unit 22 includes an update function unit 221, a management information DB 222, and a migration control function unit 223. Note that the tape control function unit 22 is a function unit corresponding to the AFSOL.

The update function unit 221 stores management information corresponding to the object in the management information DB 222. For example, when receiving an update request of the management information from the migration control function unit 223 to be described later, the update function unit 221 registers management information that is associated with the object to be migrated and is transmitted from the first storage device 1 in the management information DB 222.

The management information DB 222 stores the management information. The management information includes information regarding the object, information regarding the tape cartridge, and information regarding association between the object and the tape cartridge. Note that, because the management information DB 222 has a similar data structure to the management information DB 122, the description thereof is omitted.

The migration control function unit 223 migrates (migrate) the object. For example, when receiving the metadata corresponding to the object after receiving the notification to start the object migration, the migration control function unit 223 records the received metadata in a predetermined and prescribed location. Furthermore, when receiving the dummy data corresponding to the object after receiving the notification to start the object migration, the migration control function unit 223 discards the received dummy data. Furthermore, when receiving the management information corresponding to the object after receiving the notification to end the object migration, the migration control function unit 223 requests the update function unit 221 to update the received management information. When the update function unit 221 that receives the request to update the management information registers the management information corresponding to the object in the management information DB 222, it is possible to reuse the tape cartridge in which the object has been recorded.

For example, if original data of the object is migrated, the ID of the cartridge and the path on the DB system managed by the LTFS change with the data migration. Therefore, the management information and the cartridge are not consistent with each other. The migration control function unit 223 discards the data corresponding to the object as dummy data. In addition, by making the ID of the cartridge and the path on the DB system managed by the LTFS be the same as those in the management information of the first storage device 1, the migration control function unit 223 can make the management information and the cartridge be consistent with each other. As a result, it is possible to reuse the tape cartridge in which the object to be migrated has been recorded.

The tape device 23 can be equipped with a plurality of tape drives. The tape drive is equipped with a tape cartridge. Note that the tape device 23 corresponds to the LTFS that shows each tape cartridge as a folder of a file system.

[Flowchart of Migration Process of First Storage Device]

Figure 3:
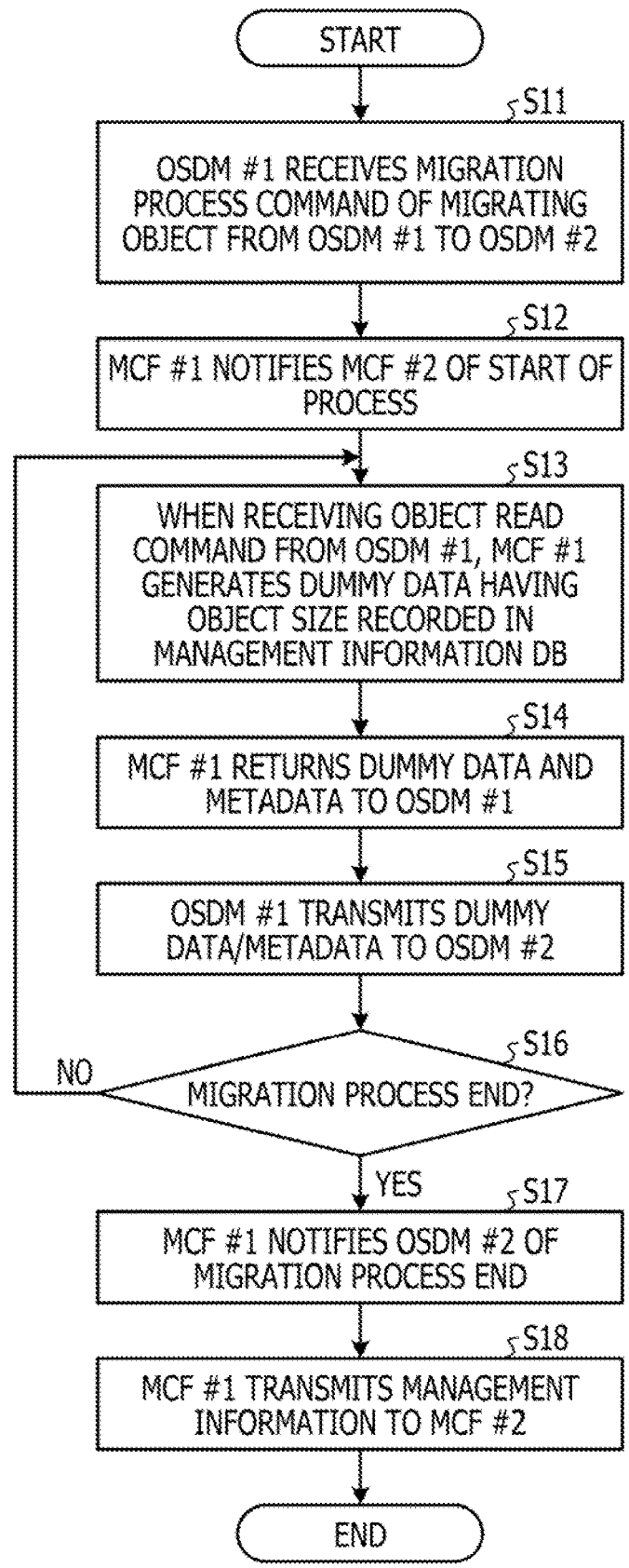
FIG. 3 is a diagram illustrating an example of a flowchart of a migration process of a first storage device according to the embodiment.

FIG. 3 is a diagram illustrating an example of a flowchart of a migration process of the first storage device according to the embodiment. Note that, in FIG. 3, the data management function unit 11 is described as OSDM #1 as a function for managing (Manage) data (Data) in an object storage (ObjectStorage). The tape control function unit 12 is described as AFSOL #1. The migration control function unit 123 is described as MCF #1 as a function (Function) for controlling (Control) migration (Migration). The data management function unit 21 is described as OSDM #2 as a function for managing data in the object storage. The tape control function unit 22 is described as AFSOL #2. The migration control function unit 223 is described as MCF #2 as a function for controlling migration. Here, it is assumed that the storage server 3 issue a migration (migration) process command of an object from OSDM #1 to OSDM #2. It is assumed that the migration (migration) process command include a plurality of IDs of target objects in the migration process.

In the first storage device 1, OSDM #1 receives the migration process command of migrating the object from OSDM #1 to OSDM #2 (step S11). When receiving the migration process command of the object from OSDM #1, MCF #1 notifies MCF #2 of the second storage device 2 of start of the migration process (step S12).

When receiving a command to read a target object from OSDM MCF #1 generates dummy data having the same size as the target object recorded in the management information DB 122 (step S13). For example, MCF #1 generates the dummy data having the same size as the object without reading the data of the target object from the tape cartridge. Then, MCF #1 returns the dummy data and the metadata corresponding to the target object to OSDM #1 (step S14).

Then, OSDM #1 transmits the dummy data and the metadata corresponding to the target object to OSDM #2 of the second storage device 2 (step S15).

Then, MCF #1 determines whether or not the migration process of the object is terminated (step S16), In a case where it is determined that the migration process of the object is not terminated (step S16; No), MCF #1 proceeds the procedure to step S13 so as to perform the migration process on a next target object.

On the other hand, in a case where it is determined that the migration process of the object is terminated (step S16; Yes), MCF #1 notifies OSDM #2 of the second storage device 2 of end of the migration process (step S17).

Then, MCF #1 transmits management information corresponding to the target object to MCF #2 of the second storage device 2 (step S18). Then, the first storage device 1 terminates the migration (migration) process.

[Flowchart of Migration Process of Second Storage Device]

Figure 4:
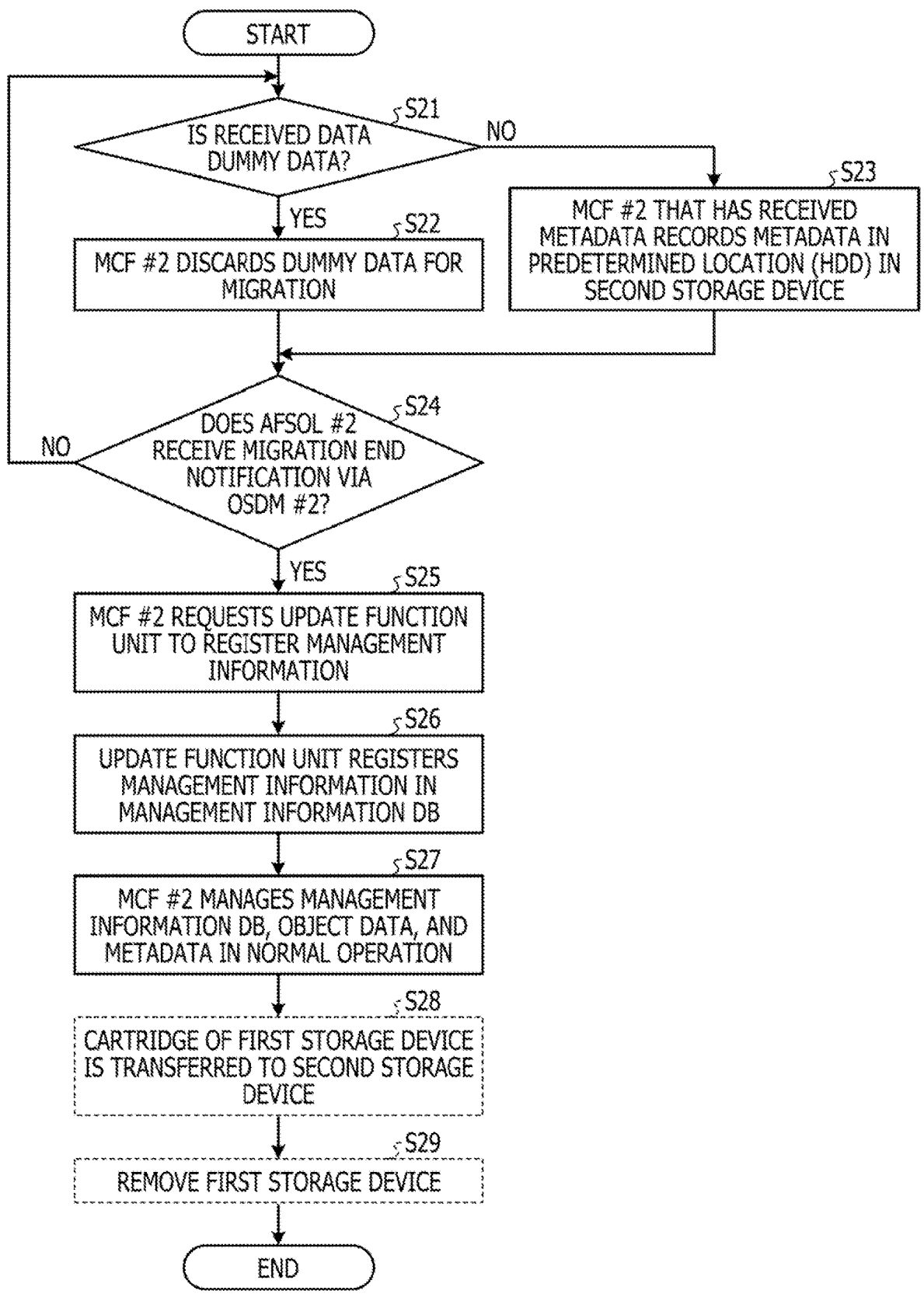
FIG. 4 is a diagram illustrating an example of a flowchart of a migration process of a second storage device according to the embodiment.

FIG. 4 is a diagram illustrating an example of a flowchart of a migration process of the second storage device according to the embodiment. Note that, in FIG. 4, the data management function unit 11 is described as OSDM #1 as in FIG. 3. The tape control function unit 12 is described as AFSOL #1. The migration control function unit 123 is described as MCF #1. The data management function unit 21 is described as OSDM #2. The tape control function unit 22 is described as AFSOL #2, The migration control function unit 223 is described as MCF #2. Here, it is assumed that OSDM #2 of the second storage device 2 receive dummy data and metadata.

In the second storage device 2, MCF #2 determines whether or not the received data is dummy data (step S21). In a case where it is determined that the received data is dummy data (step S21; Yes), MCF #2 discards the dummy data for migration (step S22). Then, MCF #2 proceeds the procedure to step S24.

On the other hand, in a case where it is determined that the received data is not dummy data (step S21; No), MCF #2 that has received the metadata records the data in a predetermined and prescribed location in the second storage device 2 (step S23). Then, MCF #2 proceeds the procedure to step S24.

AFSOL #2 determines in step S24 whether or not a migration process end notification is received via OSDM #2 (step S24). In a case where it is determined that the migration process end notification it not received via OSDM #2 (step S24; No), MCF #2 proceeds the procedure to step S21 so as to process next received data.

On the other hand, in a case where it is determined that the migration process end notification is received via OSDM #2 (step S24; Yes), MCF #2 requests the update function unit 221 to register the management information corresponding to the target object transmitted from MCF #1 of the first storage device 1 (step S25). Then, the update function unit 221 that has received the registration request registers the management information corresponding to the target object in the management information DB 222 (step S26).

Then, MCF #2 manages the management information DB 222, the data and the metadata of the object in a normal operation (step S27).

Then, an operator transfers the tape cartridge mounted on the tape device 13 of the first storage device 1 to the tape device 23 of the second storage device 2 (step S28). With this operation, the migration (migration) process of the tape cartridge is terminated.

Then, the operator removes the first storage device 1 (step S29), As a result, the replacement of the storage device is completed.

With this operation, because the storage system 9 migrates the object without reading and writing the object when the storage device using the tape cartridge is replaced, it is possible to reduce costs of an object migration time. Furthermore, because the storage system 9 migrates the object without reading and writing the object, no seek occurs at the time of reading the object in the tape cartridge, Therefore, it is possible to reduce costs of reading, and it is possible to reduce costs of the object migration time.

[Sequence of Migration Process]

Figure 5:
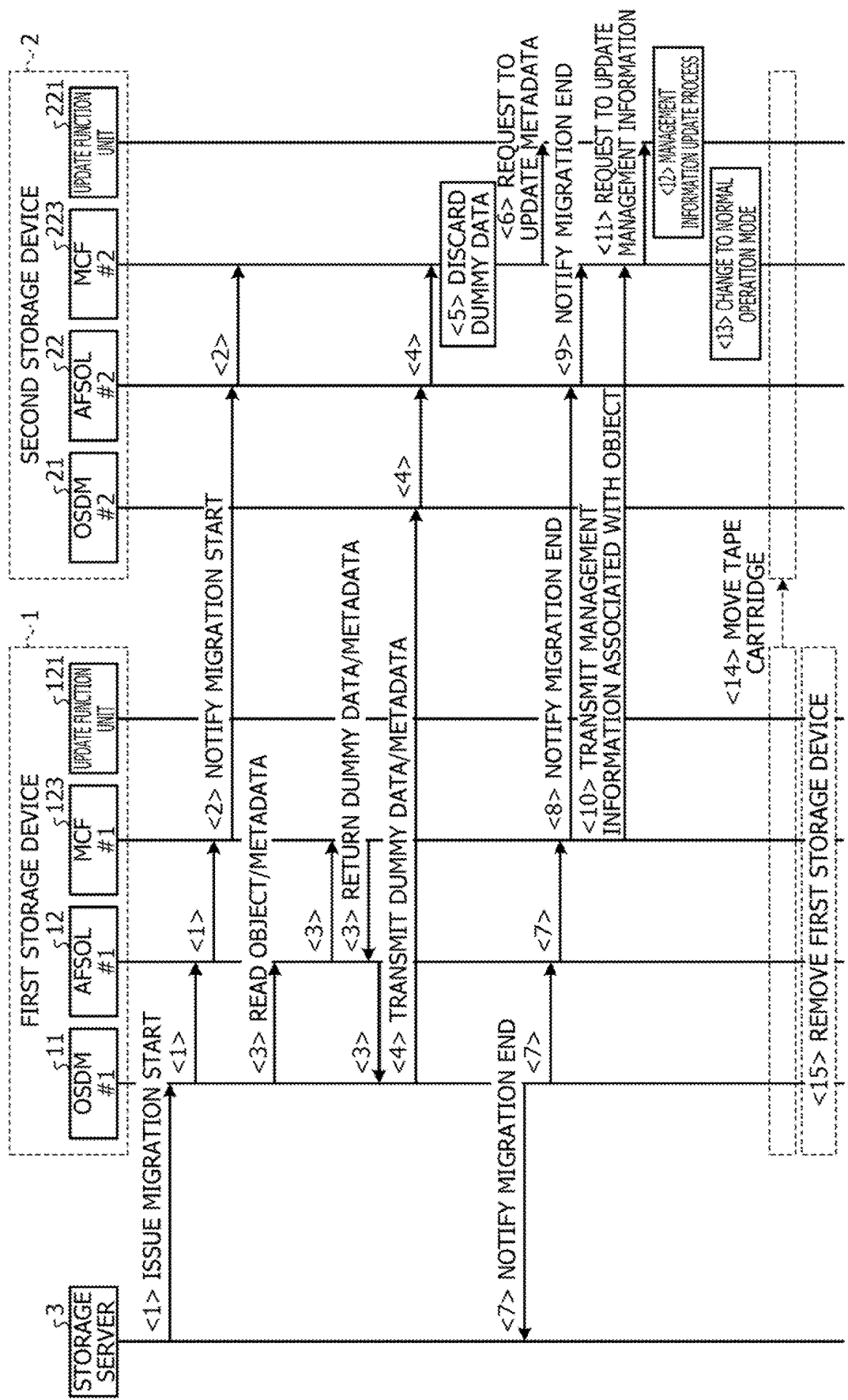
FIG. 5 is a diagram illustrating an example of a sequence of a migration process according to the embodiment.

FIG. 5 is a diagram illustrating an example of a sequence of the migration process according to the embodiment. Note that, in FIG. 5, the data management function unit 11 is described as OSDM #1 as in FIGS. 3 and 4. The tape control function unit 12 is described as AFSOL #1. The migration control function unit 123 is described as MCF #1. The data management function unit 21 is described as OSDM #2. The tape control function unit 22 is described as AFSOL #2. The migration control function unit 223 is described as MCF #2.

As illustrated in FIG. 5, in the first storage device 1, when receiving a command to start the migration process of the object issued from the storage server 3, OSDM #1 (11) notifies MCF #1 (123) of the command via AFSOL #1 (12) (<1>). MCF #1 (123) notifies MCF #2 (223) of the second storage device 2 of the command to start the migration process of the object (<2>).

In the first storage device 1, OSDM #1 (11) notifies MCF #1 (123) of a command to read an object via AFSOL #1 (12). MCF #1 (123) returns the dummy data and the metadata of the target object to OSDM #1 (11) via AFSOL #1 (12) (<3>). For example, MCF #1 (123) refers to the management information DB 122, acquires the size of the object to be migrated, and generates dummy data having the acquired size. For example, MCF #1 (123) generates dummy data corresponding to the object without reading the data of the object from the cartridge. MCF #1 (123) reads the metadata corresponding the object from a predetermined and prescribed location in the first storage device 1. Then, MCF #1 (123) returns the dummy data and the metadata corresponding to the target object to OSDM #1 (11).

In the first storage device 1, OSDM #1 (11) transmits the dummy data and the metadata corresponding to the target object to OSDM #2 (21) of the second storage device 2. In the second storage device 2, OSDM #2 (21) transmits the received dummy data and metadata corresponding to the target object to MCF #2 (223) via AFSOL #2 (22) (<4>).

In the second storage device 2, MCF #2 (223) discards the received dummy data corresponding to the target object (<5>). Then, MCF #2 (223) requests the update function unit 221 to update the received metadata corresponding to the target object (<6>). Then, the update function unit 221 records the metadata corresponding to the target object in a predetermined location.

In the first storage device 1, OSDM #1 (11) that has transmitted the dummy data and the metadata corresponding to the target object transmits an object migration end notification to the storage server 3, Furthermore, OSDM #1 (11) notifies MCF #1 (123) of the object migration end notification via AFSOL #1 (12) (<7>), MCF #1 (123) notifies MCF #2 (223) of the second storage device 2 of the object migration end notification (<8> and <9>).

Furthermore, MCF #1 (123) reads the management information associated with the target object from the management information DB 122 and transmits the read information to MCF #2 (223) of the second storage device 2 (<10>). The management information here includes correspondence management information in a correspondence management table 233a associated with the ID of the target object and cartridge management information in the cartridge management table 122b.

In the second storage device 2, MCF #2 (223) that has received the management information corresponding to the target object requests the update function unit 221 to update the management information (<11>). The update function unit 221 that has received the request to update the management information registers the management information in the management information DB 222 in association with the ID of the target object (<12>).

Then, in the second storage device 2, a mode of MCF #2 (22 changed to a normal operation mode (<13>), For example, MCF #2 (223) manages the data and the metadata of the object in a normal operation.

Thereafter, the operator moves the tape cartridge mounted on the tape device 13 of the first storage device 1 to the tape device 23 of the second storage device 2 (<14>), With this operation, the migration (migration) process of the tape cartridge s terminated. Then, the operator removes the first storage device 1 (<15>). As a result, the replacement of the storage device is completed.

[Sequence of Read/Write Process During Migration]

Figure 6:
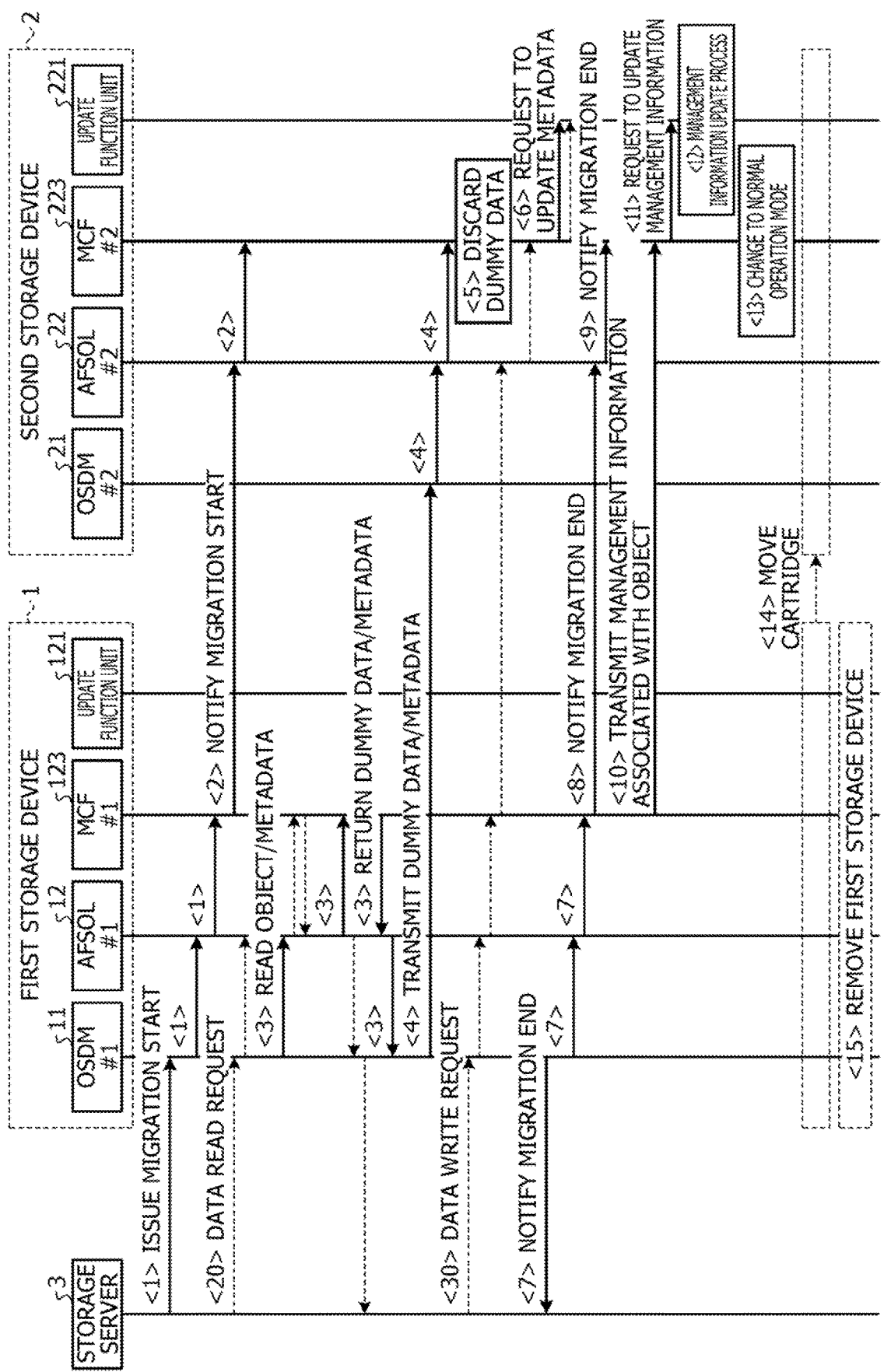
FIG. 6 is a diagram illustrating an example of a sequence of a read/write process during migration according to the embodiment.

FIG. 6 is a diagram illustrating an example of a sequence of a read/write process during migration according to the embodiment. Note that by denoting the process same as that in the migration process illustrated in FIG. 5 with the same reference numeral, the description of the overlapped process is omitted. Furthermore, a broken arrow indicates the read/write process.

As illustrated in FIG. 6, it is assumed that the storage server 3 issue an object read request to the first storage device 1 during migration (<20>) Then, in the first storage device 1, when receiving the object read request, OSDM #1 (11) notifies MCF #1 (123) of the object read request via AFSOL #1 (12). MCF #1 (123) reads an object requested to be read from the tape device 13 and returns the object to OSDM #1 (11) via AFSOL #1 (12). OSDM #1 (11) returns the read object to the storage server 3.

Furthermore, it is assumed that the storage server 3 issue an object write request to the first storage device 1 during migration (<30>). Then, in the first storage device 1, when receiving the object write request, OSDM #(11) notifies MCF #1 (123) of the object write request via AFSOL #1 (12). MCF #1 (123) notifies MCF #2 (223) of the second storage device 2 of the object write request. MCF #2 (223) requests the update function unit 221 to write the object that is requested to be written. The update function unit 221 writes the object requested to be written to the tape device 23 after the migration process of the tape cartridge is terminated, for example, at a timing when the tape cartridge is moved to the tape device 23, Furthermore, the update function unit 221 updates the management information corresponding to the object after the object requested to be written is written to the tape device 23.

[Effect of Embodiment]

According to the above embodiment, the storage system 9 includes the first storage device 1 and the second storage device 2 using the storage media of the cartridges. In order to replace the first storage device 1 with the second storage device 2, the first storage device 1 generates the dummy data corresponding to the data, instead of the data in object units, when the data in object units is migrated. The first storage device 1 transmits the management information used to manage the object and the dummy data to the second storage device 2. The second storage device 2 stores the management information in the management information DB 222 in association with the object. Then, the second storage device 2 discards the dummy data. According to the configuration, the storage system 9 can reduce costs when the first storage device 1 using the storage medium of the cartridge is replaced with the second storage device 2.

Furthermore, according to the above embodiment, the first storage device 1 generates the dummy data having the same size as the data in object units without using the data in object units obtained by reading from the storage medium of the cartridge used for the first storage device 1. The second storage device 2 discards the dummy data without writing the data in object units in the storage medium of the cartridge used for the second storage device 2. According to such a configuration, the storage system 9 can reduce costs of a reading time by reading the data from the first storage device 1 and not writing the data to the second storage device 2.

Furthermore, according to the above embodiment, the second storage device 2 migrates the data in object units by transferring the cartridge of the storage medium corresponding to the object of the first storage device 1 to the second storage device 2 and discards the dummy data. According to such a configuration, the storage system 9 can reuse the cartridge by transferring the cartridge used for the first storage device 1 to the second storage device 2, and it is possible to reduce costs (cost) for purchasing a new cartridge.

Furthermore, according to the above embodiment, when receiving a read command of data from a host device while migrating the data in object units, the first storage device 1 reads data corresponding to the read command from the storage medium and returns the read data to the host device. According to such a configuration, tile first storage device 1 can enhance availability of the system by performing the read process without blocking the read command even when the data is being migrated.

Furthermore, according to the above embodiment, when receiving a write command of data from the host device while migrating the data in object units, the first storage device 1 notifies the second storage device 2 of the write command of data. When receiving the write command of data, the second storage device 2 executes the write command of data after the data in object units has been migrated. According to such a configuration, the second storage device 2 can enhance availability of the system by accumulating the write commands without blocking the write command even when the data is being migrated.

[Others]

Note that the function of each function unit of the first storage device 1 illustrated in the drawings may have the function of the function unit having the same name of the second storage device 2, and the function of each function unit of the second storage device 2 may have the function of the function unit having the same name of the first storage device 1. As a result, in a case where the second storage device 2 is replaced with another storage device, each function unit described in the first storage device 1 can be used.

Furthermore, each component of the illustrated device is not necessarily physically configured as illustrated in the drawings. For example, specific aspects of separation and integration of the apparatus are not limited to the illustrated ones, and all or a part of the apparatus can be functionally or physically separated and integrated in an arbitrary unit according to various loads, use states, or the like. For example, the data management function unit 11 and the tape control function unit 12 may be integrated as a single unit. On the other hand, the migration control function unit 123 may be separated into a function unit that generates dummy data, a reading unit that reads metadata, and a communication unit that communicates with the second storage device 2.

Figure 7:
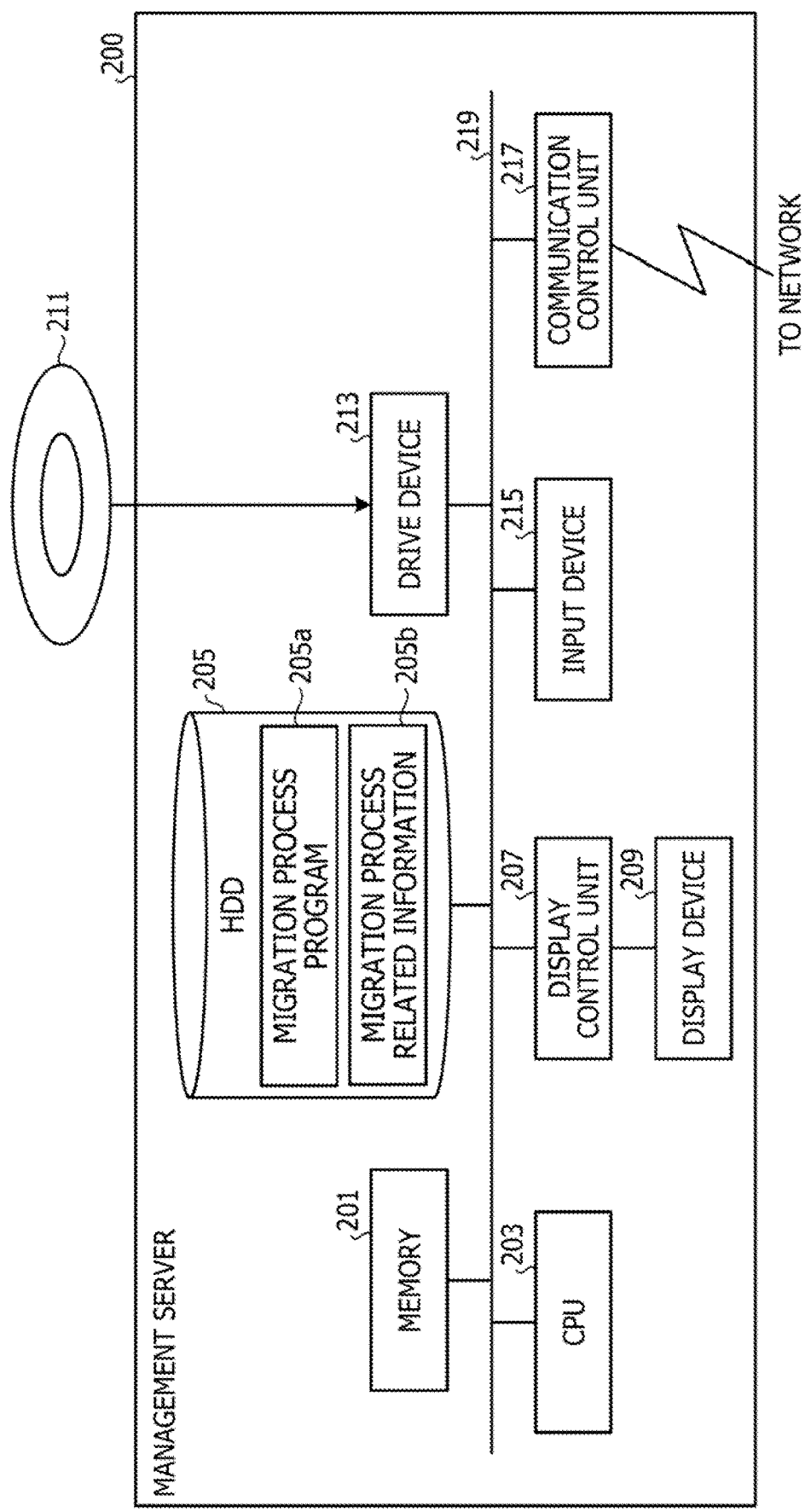
FIG. 7 is a diagram illustrating an example of a computer that executes a migration process program.

Furthermore, various processes described in the above embodiment can be realized by executing a program that has been prepared in advance by a computer. Therefore, in the following description, an example of a computer that executes a migration process program that realizes functions similar to the first storage device 1 and the second storage device 2 illustrated in FIG. 1 will be described. FIG. 7 is a diagram illustrating an example of a computer that executes a migration process program.

As illustrated in FIG. 7, a computer 200 includes a CPU 203 that executes various types of calculation processing, an input device 215 that accepts data input from a user, and a display control unit 207 that controls a display device 209. Furthermore, the computer 200 includes a drive device 213 that reads a program and the like from a storage medium, and a communication control unit 217 that exchanges data with another computer via a network. Furthermore, the computer 200 includes a memory 201 that temporarily stores various information and a Hard Disk Drive (HDD) 205. Then, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores a migration process program 205a and migration process related information 205b.

The CPU 203 reads the migration process program 205a, loads the migration process program 205a into the memory 201, and executes the migration process program 205a as a process. Such a process corresponds to each function unit of each of the first storage device 1 and the second storage device 2. The migration process related information 205b corresponds to the management information DBs 122 and 222. Then, for example, the removable disk 211 stores each piece of information such as the migration process program 205a.

Note that it is not needed to store the migration process program 205a in the HDD 205 from the beginning. For example, the program is stored in a "portable physical medium" such as a flexible disk (FD), a Compact Disk Read Only Memory (CD-ROM), a Digital Versatile Disk (DVD), a magneto-optical disk, or an Integrated Circuit (IC) card, which are inserted into the computer 200. Then, the computer 200 may read the migration process program 205a from these media and execute the migration process program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
   a host device configured to transmit a write command and a read command;
   a first storage device that includes a first memory and a first processor coupled to the first memory; and
   a second storage device that includes a second memory and a second processor coupled to the second memory,
   the first processor is configured to:
   when migrating first data that indicates at least one selected from a data creation date, a data creator, a data type, a storage period, and a number of times of copies, generate dummy data whose size is a same size as a size of an object related to the first data without using data obtained by reading from a storage medium of a cartridge used for the first storage device, and
   transmit management information used to manage the object and the dummy data to the second storage device, and
   the second processor is configured to:
   store the management information in a storage unit in association with the object,
   discard the dummy data without writing the first data in a storage medium of a cartridge used for the second storage device, and
   when migration of the object is completed, cause the management information to be updated so that the management information indicates that the cartridge used for the first storage device is available for the write command and the read command from the host device.

2. The storage system according to claim 1, wherein the second processor is configured to:
   migrate the first data by transferring the cartridge of the storage medium that corresponds to the object of the first storage device to the second storage device, and
   discard the dummy data.

3. The storage system according to claim 1, wherein the first processor is configured to:
   when receiving a read command for second data from the host device while migrating the first data, read second data that corresponds to the read command for second data from one storage medium selected from the storage medium of the cartridge used for the first storage device and the storage medium of the cartridge used for the second storage device, and
   return the read second data to the host device.

4. The storage system according to claim 1, wherein
   the first processor is configured to notify the second storage device of a write command of third data when receiving the write command of the third data from the host device while migrating the first data, and
   the second processor is configured to:
   when receiving the write command of the third data, accumulate the write command of the third data, and
   execute the write command of the third data after the migration of the first data has been completed.

5. A migration destination storage device, comprising:
   a memory;
   a processor coupled to the memory and the processor configured to:
   store, in a storage unit in association with an object, a management information transmitted by a migration source storage device,
   discard a dummy data, and
   when migration of the object is completed, cause the management information to be updated so that the management information indicates a cartridge used for the migration source storage device is available for a write command and a read command from a host device, and
   the migration source storage device is configured to:
   when migrating first data that indicates at least one selected from a data creation date, a data creator, a data type, a storage period, and a number of times of copies, generate dummy data whose size is a same size as a size of an object related to the first data without using data obtained by reading from a storage medium of a cartridge used for the first storage device, and transmit the management information used to manage the object and the dummy data.

\* \* \* \* \*